United States Patent
Harder et al.

(10) Patent No.: US 12,149,204 B2
(45) Date of Patent: Nov. 19, 2024

(54) HEAT SINK AND ASSOCIATED SOLAR PANEL

(71) Applicant: TOTALENERGIES ONETECH, Courbevoie (FR)

(72) Inventors: Nils Harder, Paris (FR); Camille Bainier, Chevreuse (FR)

(73) Assignee: TOTALENERGIES ONETECH, Courbevoie (FR)

( * ) Notice: Subject to any disclaimer, the term of this patent is extended or adjusted under 35 U.S.C. 154(b) by 75 days.

(21) Appl. No.: 17/787,453

(22) PCT Filed: Dec. 18, 2020

(86) PCT No.: PCT/EP2020/087001
§ 371 (c)(1),
(2) Date: Jun. 20, 2022

(87) PCT Pub. No.: WO2021/123148
PCT Pub. Date: Jun. 24, 2021

(65) Prior Publication Data
US 2023/0031133 A1    Feb. 2, 2023

(30) Foreign Application Priority Data

Dec. 20, 2019    (EP) .................................... 19306736

(51) Int. Cl.
*H02S 40/42*    (2014.01)

(52) U.S. Cl.
CPC .................................... *H02S 40/42* (2014.12)

(58) Field of Classification Search
None
See application file for complete search history.

(56) References Cited

U.S. PATENT DOCUMENTS

| | | | |
|---|---|---|---|
| 2011/0297361 A1* | 12/2011 | Carbone | H01L 31/0521 165/185 |
| 2013/0049041 A1* | 2/2013 | Ramer | H01S 5/02423 257/432 |
| 2015/0380585 A1* | 12/2015 | Sethi | H01L 31/055 136/259 |
| 2018/0209635 A1* | 7/2018 | Luiten | F21V 29/713 |

* cited by examiner

Primary Examiner — Eli S Mekhlin
(74) Attorney, Agent, or Firm — Tarolli, Sundheim, Covell & Tumino LLP

(57) ABSTRACT

The present invention refers to a heat sink (5) for bi-facial photovoltaic modules (3) configured to be secured to the back side (3b) of at least one bi-facial photovoltaic module (3) wherein the heat sink (5) comprises a plurality of rods (11) having a thermal conductivity higher than 10 $W \cdot m^{-1} \cdot K^{-1}$ and arranged as a mesh configured to be in contact with the back side (3b) of the bi-facial photovoltaic module (3).

7 Claims, 4 Drawing Sheets

HEAT SINK AND ASSOCIATED SOLAR PANEL

CROSS REFERENCE TO RELATED APPLICATION

This application is a U.S. National Phase of International Application No. PCT/EP2020/087001 filed Dec. 18, 2020, which claims priority to European Patent Application No. EP19306736.0, filed Dec. 20, 2019, both of which are incorporated by reference herein in their entirety.

BACKGROUND OF THE INVENTION

The field of the present invention refers to the photovoltaic energy production and in particular to the heat dissipation of solar panels and more particularly bi-facial solar panels configured for receiving solar rays both on the front face and the back face of the solar panel.

The yield of solar panels depends on their temperature and tends to largely decrease when the temperature of the solar panel exceeds a given temperature threshold.

To overcome this yield reduction, it is well known to use heat dissipation elements to limit the increase of temperature of the solar panel.

Different techniques are known in the state of the art, especially active solutions referring for example to the spraying of a liquid on the solar panel, an air ventilation or a fluid circulation in contact or in proximity with the solar panels. There is also passive solutions such as heat sinks.

However, most of these solutions are difficult or even impossible to adapt on bi-facial solar panels for which solar rays must be able to reach the front and the back sides of the solar panel. Furthermore, some solutions may be difficult or impossible to adapt for solar panels located in areas without energy supply or fluid supply such as solar farms located in desert areas.

Besides, in order to be cost effective, the solution has to be adaptable to any kind of solar panel without requiring an adaptation of the photovoltaic module on which the solution is positioned.

The present invention aims therefore at providing an equipment enabling heat dissipation which can be adapted on most bi-facial solar panels and which can be used in most conditions in order to improve the yield of bi-facial solar panel.

SUMMARY OF THE INVENTION

The present invention refers to a heat sink for bi-facial photovoltaic modules configured to be secured to the back side of at least one bi-facial photovoltaic module wherein the heat sink comprises a plurality of rods having a thermal conductivity higher than 10 $W \cdot m^{-1} \cdot K^{-1}$ and arranged as a mesh configured to be in contact with the back side of the bi-facial photovoltaic module.

According to another aspect of the invention, the rods constitute a tridimensional pattern.

According to a further aspect of the invention, the rods are metallic rods.

According to an additional aspect of the invention, the rods comprise a reflective surface configured for reflecting solar rays in a specular manner.

According to a further aspect of the invention, the rods are cylindrical.

According to another aspect of the invention, the rods have an elongated cross-section along a direction perpendicular to the back side of the bi-facial photovoltaic module.

According to an additional aspect of the invention, the rods are arranged to form a first grid configured for being in contact with the back side of the bi-facial photovoltaic module, a second grid arranged parallel to the first grid and a plurality of transverse rods arranged between the first and the second grids.

According to a further aspect of the invention, the rods configured to be in contact with the back side of the bi-facial photovoltaic module comprise a flattened portion to improve the contact surface with the back side of the bi-facial photovoltaic module.

The present invention also refers to a solar panel comprising at least one bi-facial photovoltaic module and a heat sink secured to the back side of the at least one bi-facial photovoltaic module.

According to a further aspect of the invention, the heat sink is glued to the back side of the at least one bi-facial photovoltaic module.

DETAILED DESCRIPTION OF THE INVENTION

The following achievements are examples. Although, the specification refers to one or several embodiments, it does not imply that each reference refers to the same embodiment or that the features apply only to a single embodiment. Simple features of different embodiments can also be combined to provide other embodiments.

Figure 1:
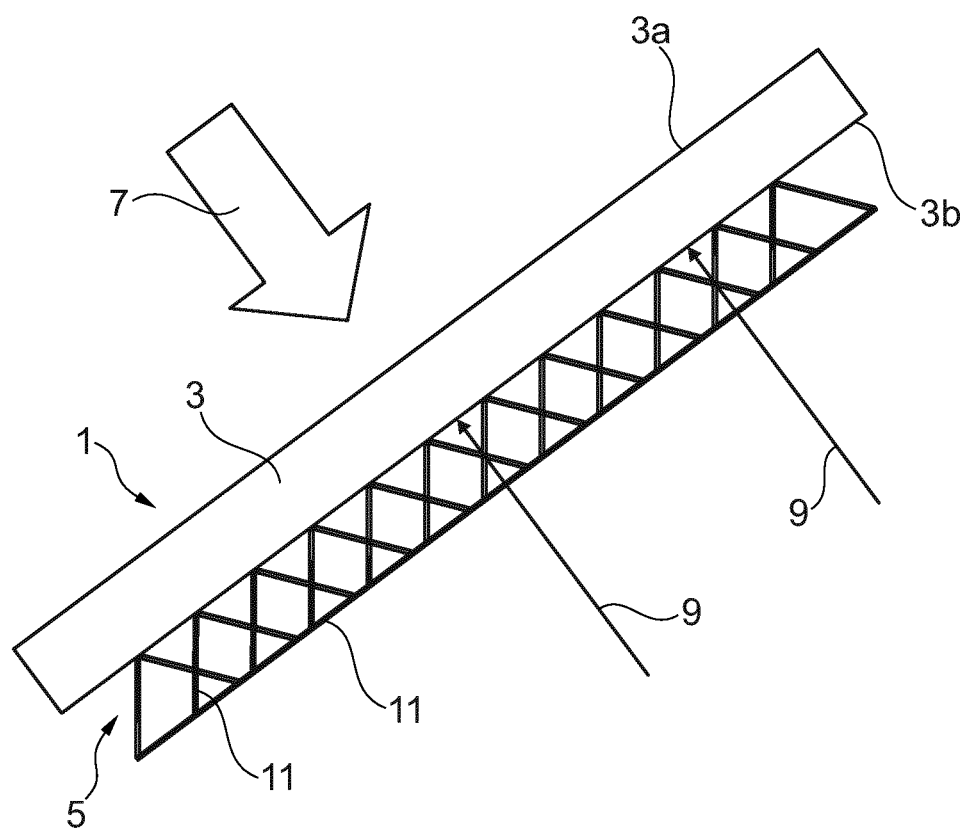
FIG. 1 is a diagram of a side view of a solar panel comprising a heat sink according to an embodiment of the present invention.

FIG. 1 represents a diagram of a solar panel 1 comprising a bi-facial photovoltaic module 3 and a heat sink 5 disposed on the back side 3b of the bi-facial photovoltaic module 3. A bi-facial photovoltaic module 3 refers to a photovoltaic module configured for receiving solar rays from both sides or faces, namely, the front face 3a corresponding to the upper face receiving solar rays directly from the sun as represented by the arrow 7 and the back face 3b corresponding to the lower face receiving reflected solar rays represented by the arrows 9. Reflection of the solar rays may be achieved on the ground or on any other surfaces reflecting a solar ray toward the back side 3b. The bi-facial photovoltaic module 3 is then configured for converting solar rays coming from both sides into electricity.

The heat sink 5 comprises a plurality of rods 11 arranged as a tridimensional mesh configured to be (partly) in contact with the back side 3b of the bi-facial photovoltaic module 3. A heat sink 5 may be configured to be disposed a single bi-facial photovoltaic module 3 or on a plurality of adjacent bi-facial photovoltaic modules 3.

The rods 11 refer to elongated elements (having a dimension much longer than the other dimensions). The cross-section of the rods 11 may be circular to produce cylindrical rods but other shape may also be used. In particular, the cross-section may be flattened to reduce the diameter of the rods 11 in a direction parallel to the back side 3b of the bi-facial photovoltaic module 3 in order to reduce the number of reflected solar rays 9 that are perpendicular to the back side 3b of the bi-facial photovoltaic module impinging the rods 11. Furthermore, the rods 11 may be straight (according to their elongated dimension) but other shapes may also be used such as curved or bended rods 11. The rods 11 are made in a material having a thermal conductivity higher than 10 $W \cdot m^{-1} \cdot K^{-1}$, for example a metal such as aluminum or steel or any other metal. The diameter of the rods 11 is chosen as small as possible to limit the shadow produced by the rods 11. The diameter of the rods 11 and the height of the heat sink 5 may be chosen according to the thermal conductivity of the rods 11. Indeed, a higher conductivity enables the use of rods 11 having a higher length as the heat may be transferred along a longer portion of the rods 11 to be dissipated.

In a preferred embodiment, the rods 11 comprise a reflecting surface configured for reflecting solar rays in a specular manner in order to enable reflection of solar rays 9 impinging the rods 11 with an angle which is not perpendicular to the back side 3b of the bi-facial photovoltaic module to be reflected toward the back side 3b of the bi-facial photovoltaic module 3. The reflection may be obtained by the material of the rods 11 itself or by a dedicated surface treatment or by a dedicated covering of a reflecting layer on the surface of the rods 11.

The density of rods is chosen so that most of the reflected solar rays 9 may reach the back side 3b of the bi-facial photovoltaic module 3. The shadow (or orthogonal projection) produces by the heat sink 5 corresponds for example to less than 50% of the back side of the bi-facial photovoltaic module 3. Furthermore, the rods 11 of the heat sink 5 are distributed over the surface of the back side 3b so that heat from the whole photovoltaic module may be dissipated through the heat sink and so that no local hot points remains. Such distribution corresponds for example to the fact that circular surfaces that are not in contact with a rod 11 covers at most a limited surface, for example a surface smaller than 5% of the total surface of the back side 3b.

Figure 2:
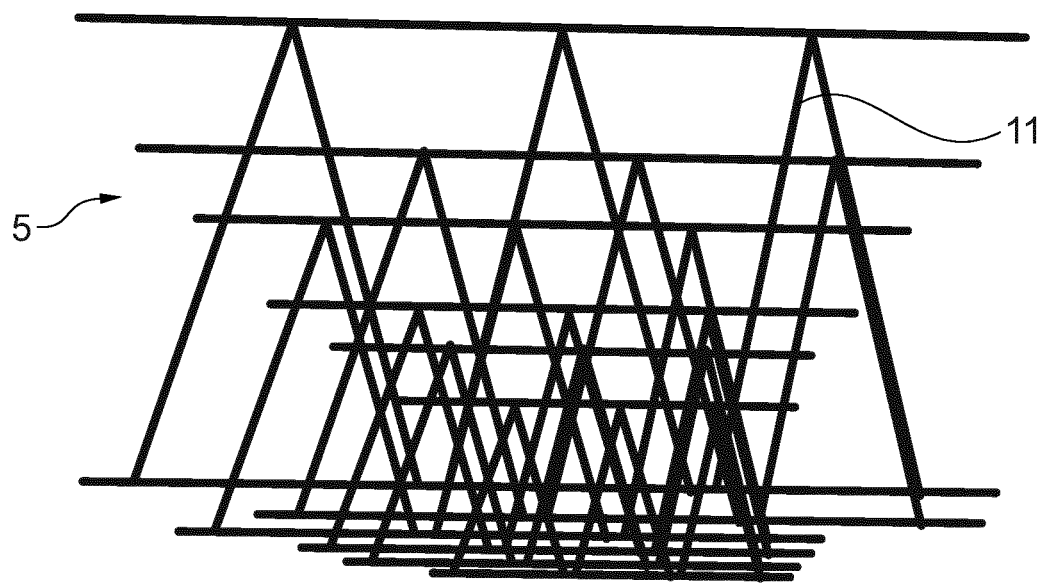
FIG. 2 is a diagram of a perspective view of the heat sink according to a first embodiment.
Figure 3:
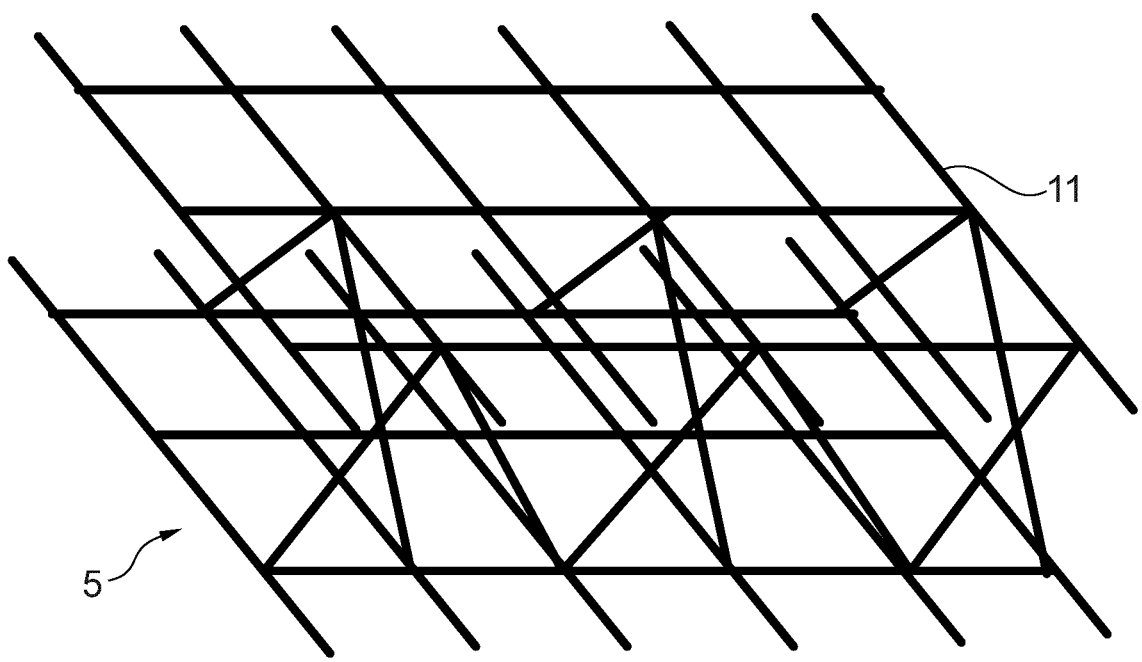
FIG. 3 is a diagram of a perspective view of the heat sink according to a second embodiment.

FIG. 2 represents a first embodiment of a heat sink 5 comprising a plurality of straight rods 11. The heat sink 5 comprises a first plurality of rods 11 arranged as a first grid and configured to be in contact with the back side 3b of the photovoltaic module 3, a second plurality of rods 11 arranged as a second grid destined to be disposed parallel to the first grid and a third plurality of rods 11 linking the first and the second grids. The third plurality of rods may be arranged perpendicular to the general direction of the first and second grids but may also be arranged in other directions as represented in FIG. 2 or both perpendicular to the first and the second grid and in other directions as represented in FIG. 3. The grids may also be replaced by other two-dimensional mesh patterns, for example crossed rods having angles different than 90°.

Figure 4:
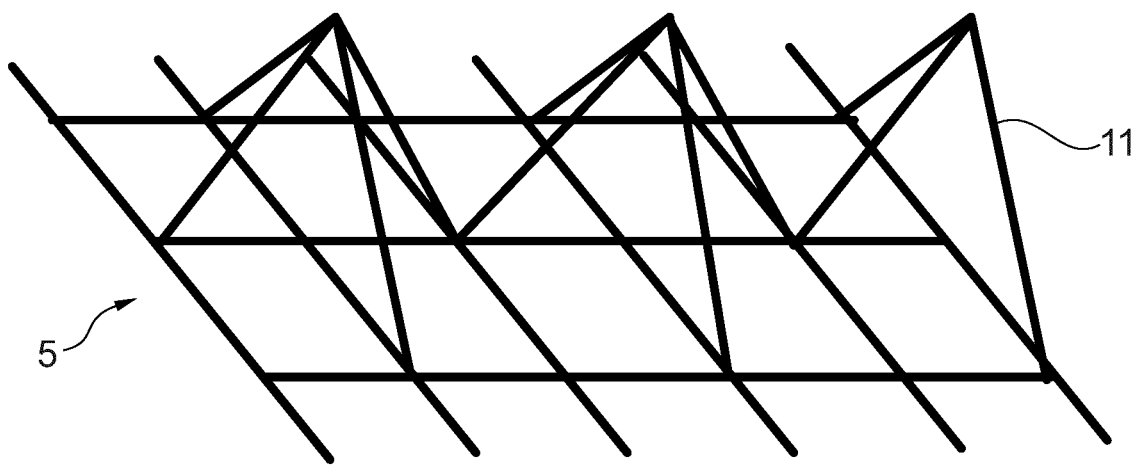
FIG. 4 is a diagram of a perspective view of the heat sink according to a third embodiment.
Figure 5:
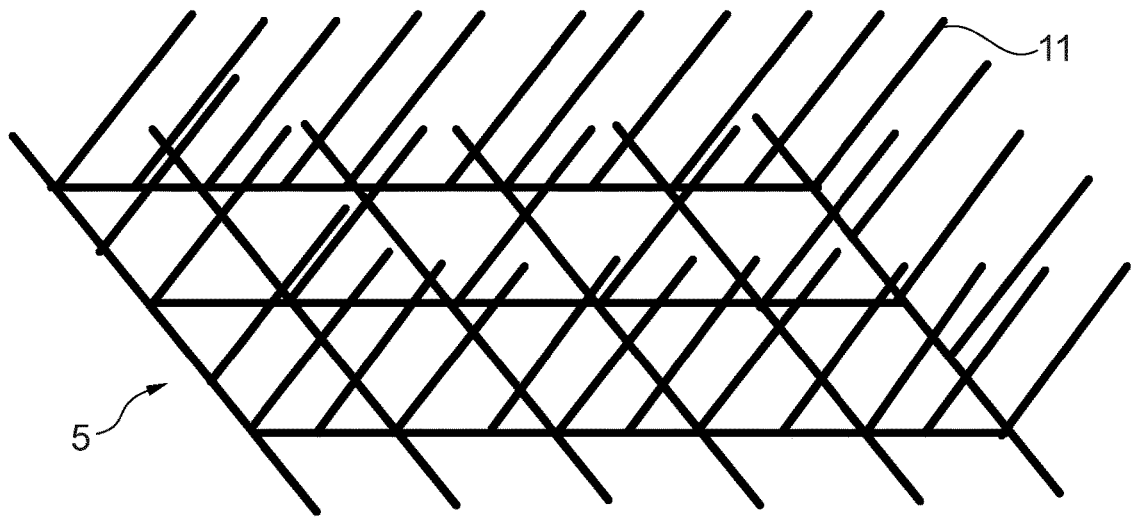
FIG. 5 is a diagram of a perspective view of the heat sink according to a fourth embodiment.
Figure 6:
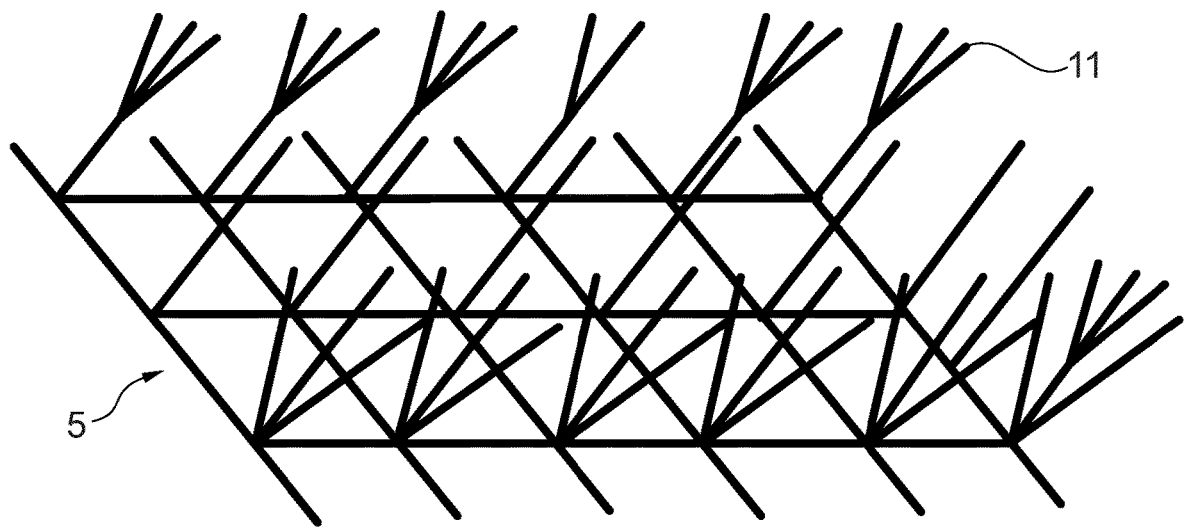
FIG. 6 is a diagram of a perspective view of the heat sink according to a fifth embodiment.

According to another embodiment, the heat sink 5 may comprise a first plurality of rods 11 arranged as a grid configured to be in contact with the back side 3b of the bi-facial photovoltaic module 3 and a second plurality of rods 11 extending outwards from the grid to produce three dimensional patterns such as pyramids as represented in FIG. 4. Other patterns may also be arranged based on straight bars such as simple rods extending perpendicular from the grid as represented in FIG. 5 or tree-like pattern as represented in FIG. 6. Other pattern based on straight or curved rods 11 may also be used to produce a mesh enabling the heat to be transmitted through the different rods 11 and dissipated in the air surrounding the rods 11.

Besides, the portion of the rods 11 configured to be in contact with the back side 3b of the bi-facial photovoltaic module 3 may comprise a flattened part to increase the contact surface between the rods 11 and the back side 3b of the bi-facial photovoltaic module 3 and to provide a pedestal to ease the fastening of the heat sink 5 to the bi-facial photovoltaic module 3. The cross-section of the rods 11 configured to be in contact with the back side of the bi-facial photovoltaic module may therefore be rectangular to increase the contact surface with the said back side 3b.

According to an embodiment of the present invention, the heat sink 5 is glued to the back side 3b of the bi-facial photovoltaic module 3. In order to improve the efficiency of the heat sink 5, the thickness of glue may be limited, for example less than 2 mm and the used glue may have thermal conductivity properties obtained for example by the addition of dedicated particles having a high thermal conductivity such as carbon fiber particles. The gluing of the heat sink 5 enables to adapt the heat sink on any types of bi-facial photovoltaic modules 3.

The use of a heat sink 5 arranged on the back side 3b of a bi-facial photovoltaic module 3 and comprising a mesh of rods 11 presenting large openings enables dissipating efficiently the heat from the bi-facial photovoltaic module 3 while allowing reflected solar rays 9 to reach the back side 3b of the bi-facial photovoltaic module 3 to be converted into electricity. Such heat sink 5 may be adapted to any bi-facial photovoltaic module 3 and does not require any external supply and can therefore be adapted to solar farms located in desert regions.

The invention claimed is:

1. A solar panel comprising at least one bi-facial photovoltaic module and a heat sink secured to a back side of the at least one bi-facial photovoltaic module, wherein the heat sink comprises a plurality of rods having a thermal conductivity higher than 10 $W \cdot m-1 \cdot K-1$ (W/mK), arranged as a mesh configured to be in contact with the back side of the bi-facial photovoltaic module, and comprising a reflective surface configured for reflecting solar rays in a specular manner, wherein the rods are arranged to form a first grid configured for being in contact with the back side of the bi-facial photovoltaic module, a second grid arranged parallel to the first grid, and a plurality of transverse rods arranged between the first grid and the second grid.

2. The solar panel in accordance with claim 1 wherein the rods constitute a three-dimensional pattern.

3. The solar panel in accordance with claim 1 wherein the rods are metallic rods.

4. The solar panel in accordance with claim 1 wherein the rods are cylindrical.

5. The solar panel in accordance with claim 1 wherein the rods have an elongated cross-section along a direction perpendicular to the back side of the bi-facial photovoltaic module.

6. The solar panel in accordance with claim 1 wherein the rods configured to be in contact with the back side of the bi-facial photovoltaic module comprise a flattened portion to improve the contact surface with the back side of the bi-facial photovoltaic module.

7. The solar panel in accordance with claim 1 wherein the heat sink is glued to the back side of the at least one bi-facial photovoltaic module.

\* \* \* \* \*